(12) United States Patent
Elferich

(10) Patent No.: US 8,729,830 B2
(45) Date of Patent: May 20, 2014

(54) FEEDBACK CIRCUIT FOR ZERO-VOLTAGE-SWITCHING CONVERTER

(75) Inventor: Reinhold Elferich, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 194 days.

(21) Appl. No.: 13/505,547

(22) PCT Filed: Oct. 29, 2010

(86) PCT No.: PCT/IB2010/054911
§ 371 (c)(1),
(2), (4) Date: May 2, 2012

(87) PCT Pub. No.: WO2011/055285
PCT Pub. Date: May 12, 2011

(65) Prior Publication Data
US 2012/0212979 A1 Aug. 23, 2012

(30) Foreign Application Priority Data
Nov. 6, 2009 (EP) .................................... 09175211

(51) Int. Cl.
H05B 37/02 (2006.01)
(52) U.S. Cl.
USPC .......................................... 315/307; 323/282
(58) Field of Classification Search
USPC ......... 315/219, 224, 226, 291, 299, 307, 312, 315/350, 294; 323/266, 267, 271, 276, 323/282–289; 363/65, 71
See application file for complete search history.

(56) References Cited

U.S. PATENT DOCUMENTS

| | | | |
|---|---|---|---|
| 5,062,031 A | 10/1991 | Flachenecker et al. | |
| 6,057,652 A * | 5/2000 | Chen et al. | 315/307 |
| 6,515,437 B1 * | 2/2003 | Zinkler et al. | 315/312 |
| 6,674,274 B2 * | 1/2004 | Hobrecht et al. | 323/285 |
| 7,443,107 B2 * | 10/2008 | Shannon et al. | 315/224 |
| 2004/0056642 A1 | 3/2004 | Nebrigic et al. | |
| 2007/0171679 A1 | 7/2007 | Nielsen et al. | |

FOREIGN PATENT DOCUMENTS

WO 03056878 A1 7/2003

OTHER PUBLICATIONS

Mohamed Z. Youssef; "A Novel Single Stage AC-DC Self-Oscillating Series-Parallel Resonant Converter", IEEE Transactions on Power Electronics, vol. 21, No. 6, Nov. 2006, pp. 1735-.

* cited by examiner

Primary Examiner — Rajnikant Patel

(57) ABSTRACT

A feedback circuit for a zero-voltage-switching converter (1) for feeding a load circuit (2, 3), which converter (1) comprises a chopper (4), a driver (5) and a resonant tank (6), is provided with an arrangement (10) for receiving a first signal derived from a resonant tank signal and a second signal derived from a load circuit signal and for generating in response thereto a control signal for the driver (5). Such converters (1) can stand feeding voltage fluctuations and load variations relatively well. The arrangement (10) may comprise an error circuit (12) for, in response to the second signal and a reference signal, generating an error signal, and a combiner circuit (13) for, in response to the first signal and the error signal, generating the control signal. The same converter (1) may be used for supplying two or more load circuits (2, 3), in which case an error circuit (15) may generate an error signal and a duty cycle signal or two error signals.

14 Claims, 11 Drawing Sheets

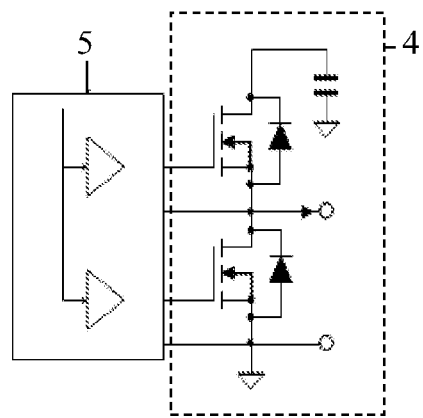 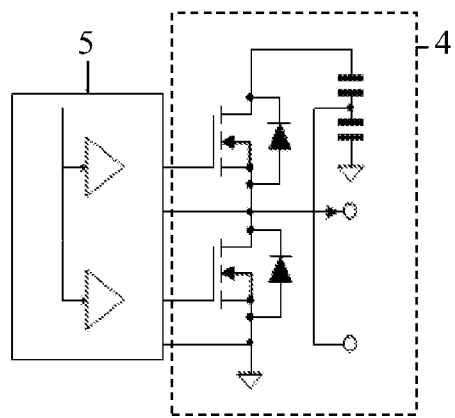
FIG. 5A  FIG. 5B
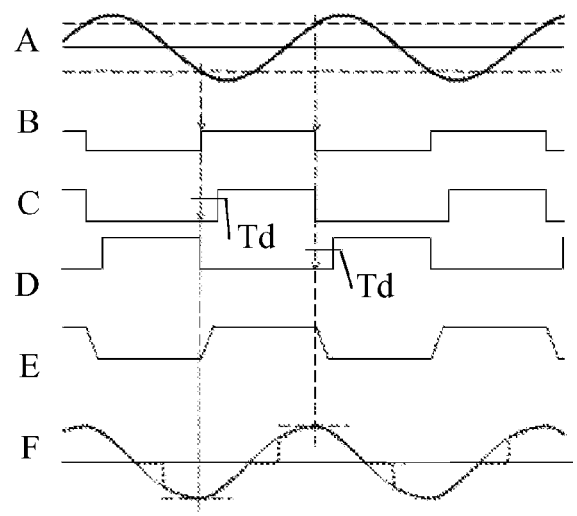
FIG. 6

FEEDBACK CIRCUIT FOR ZERO-VOLTAGE-SWITCHING CONVERTER

FIELD OF THE INVENTION

The invention relates to a feedback circuit for a zero-voltage-switching converter for feeding a load circuit. The invention further relates to a zero-voltage-switching converter comprising the feedback circuit, and to a device comprising the zero-voltage-switching converter.

Examples of such a zero-voltage-switching converter are resonant power converters. Examples of such a device are consumer products and professional products. Examples of the load circuit are circuits with one or more light emitting diodes.

BACKGROUND OF THE INVENTION

U.S. 2007/0171679 discloses a series-parallel resonant converter or zero-voltage-switching converter with a charge mode control. This converter has two different modes, a frequency mode and a charge mode. In the frequency mode, a load circuit signal is fed back. In the charge mode, a transformer circuit signal is fed back. For small loads, the converter is in the frequency mode. For high loads, the converter is in the charge mode.

In general, resonant converters are relatively sensitive to feeding voltage fluctuations and to load variations.

SUMMARY OF THE INVENTION

Objects of the invention are to provide a feedback circuit for a zero-voltage-switching converter, a zero-voltage-switching converter comprising a feedback circuit, and a device comprising a zero-voltage-switching converter, which zero-voltage-switching converter can stand feeding voltage fluctuations and load variations relatively well.

According to a first aspect of the invention, a feedback circuit is provided for a zero-voltage-switching converter for feeding a load circuit, the zero-voltage-switching converter comprising a chopper, a driver and a resonant tank, the feedback circuit comprising an arrangement for receiving a first signal derived from a resonant tank signal and for receiving a second signal derived from a load circuit signal and for generating, in response to the first and second signals, a control signal for the driver, the feedback circuit being oscillatorless.

A feedback circuit provides feedback to a zero-voltage-switching converter. This zero-voltage-switching converter feeds a load circuit and comprises a chopper, a driver and a resonant tank. The chopper feeds the load circuit via the resonant tank. The driver drives the chopper. The feedback circuit comprises an arrangement for receiving a first signal derived from a resonant tank signal for example from the resonant tank and for receiving a second signal derived from a load circuit signal from the load circuit. In response to the first and second signals, the arrangement generates a control signal for the driver. The feedback circuit is oscillatorless. In other words, the feedback circuit does not comprise an oscillator.

By simultaneously using the first signal, derived from the resonant tank signal, and the second signal, derived from the load circuit signal, for controlling the driver, the zero-voltage-switching converter can stand feeding voltage fluctuations and load variations relatively well.

According to a first option, the resonant tank signal may originate from (a part of) the resonant tank, to for example define a signal across and/or flowing through (a part of) the resonant tank. According to a second option, the resonant tank signal may define a state of the resonant tank, in which case this resonant tank signal may originate from (a part of) the resonant tank or from another location.

U.S. 2004/0056642 discloses a feedback circuit for a converter, which converter is not a zero-voltage-switching converter. This feedback circuit does not simultaneously use a first signal derived from a resonant tank signal and a second signal derived from a load circuit signal.

U.S. Pat. No. 5,062,031 discloses a feedback circuit for a zero-current-switching converter, which zero-current-switching converter is not a zero-voltage-switching converter.

According to an embodiment, the feedback circuit is defined by the arrangement comprising
  an error circuit for, in response to the second signal and a reference signal, generating an error signal, and
  a combiner circuit for, in response to the first signal and the error signal, generating the control signal.

An error circuit is used for generating an error signal in dependence on a difference between the second signal and a reference signal. A combiner circuit is used for generating a control signal for controlling the driver in dependence on the first signal and the error signal.

According to an embodiment, the feedback circuit is defined by the error circuit comprising
  a first converter circuit for receiving the reference signal,
  a second converter circuit for receiving the second signal, outputs of the first and second converter circuits being coupled to each other for providing the error signal, and
  an integrator circuit for integrating the error signal.

A simple embodiment of the error circuit comprises first and second converter circuits and an integrator circuit. A first converter circuit for example comprises a first voltage-to-current converter or a first voltage-controlled current generator, and a second converter circuit for example comprises a second voltage-to-current converter or a second voltage-controlled current generator followed by a factor multiplier. An integrator circuit for example comprises a serial connection of a capacitor and a resistor. Other and/or more complex error circuits are not to be excluded.

According to an embodiment, the feedback circuit is defined by the combiner circuit comprising
  a first differential circuit for receiving the first signal and the error signal,
  a second differential circuit for receiving the first signal and an inversion of the error signal, and
  a set and reset circuit for receiving output signals from the first and second differential circuits and for providing the control signal.

A simple embodiment of the combiner circuit comprises first and second differential circuits and a set and reset circuit. A differential circuit for example comprises an operational amplifier, and a set and reset circuit for example comprises a flip flop. Other and/or more complex combiner circuits are not to be excluded.

According to an embodiment, the feedback circuit is defined by the load circuit comprising a first load circuit and a second load circuit, the load circuit signal comprising a first load circuit signal and a second load circuit signal, the second signal comprising a third signal derived from the first load circuit signal and a fourth signal derived from the second load circuit signal. This is a highly advantageous embodiment owing to the fact that the same zero-voltage-switching converter is used for supplying two or more load circuits. The second signal comprises a third signal derived from the first load circuit signal from the first load circuit and a fourth signal derived from the second load circuit signal from the second load circuit.

It is observed that, in case the same zero-voltage-switching converter is used for supplying two or more load circuits, the feedback circuit may be oscillatorless or not. In other words, the fact that the same zero-voltage-switching converter is used for supplying two or more load circuits may be used in combination with a feedback circuit that does not comprise an oscillator and in combination with a feedback circuit that does comprise an oscillator.

According to an embodiment, the feedback circuit is defined by the arrangement comprising
an error circuit for generating an error signal and another signal, in response to the third and fourth signals and first and second reference signals, and
a combiner circuit for generating the control signal, in response to the first signal and the error signal and the other signal.

An error circuit is used for generating an error signal and another signal in dependence on the third and fourth signals and first and second reference signals. A combiner circuit is used for generating a control signal for controlling the driver in dependence on the first signal and the error signal and the other signal.

According to an embodiment, the feedback circuit is defined by the combiner circuit comprising
a first differential circuit for receiving the first signal and the error signal,
a second differential circuit for receiving the first signal and an inversion of a product of the error signal and the other signal, which other signal is a duty cycle signal, and
a set and reset circuit for receiving output signals from the first and second differential circuits and for providing the control signal.

A simple embodiment of the combiner circuit comprises first and second differential circuits and a set and reset circuit. A differential circuit for example comprises an operational amplifier, and a set and reset circuit for example comprises a flip flop. Other and/or more complex combiner circuits are not to be excluded.

According to an embodiment, the feedback circuit is defined by the combiner circuit comprising
a first differential circuit for receiving the first signal and the error signal,
a second differential circuit for receiving the first signal and an inversion of the other signal, which other signal is a further error signal, and
a set and reset circuit for receiving output signals from the first and second differential circuits and for providing the control signal.

Another simple embodiment of the combiner circuit comprises first and second differential circuits and a set and reset circuit. A differential circuit for example comprises an operational amplifier, and a set and reset circuit for example comprises a flip flop. Other and/or more complex combiner circuits are not to be excluded.

According to an embodiment, the feedback circuit is defined by the first signal, being derived from the resonant tank signal via an integrator and/or a filter circuit and/or a first connection, and the second signal, being derived from the load circuit signal via a second connection. An integrator and/or a filter circuit may improve the operation of the feedback circuit.

According to an embodiment, the feedback circuit is defined by the resonant tank signal being a voltage across or a current flowing through one or more elements of the resonant tank, and the load circuit signal being a voltage across or a current flowing through one or more elements of the load circuit. An element of the resonant tank may be a capacitor or a coil or a resistor. An element of the load circuit may be a load or a resistor.

The arrangement, each circuit in the arrangement and/or each combination of two or more circuits in the arrangement may comprise and/or may be realized via a computer or a processor or a controller etc. for running a computer program product for performing method steps and/or functions, such as for example generating the control signal in response to the first and second signals, and/or such as for example generating the error signal in response to the second signal and the reference signal and generating the control signal in response to the first signal and the error signal, and/or such as for example generating the error signal and the other signal in response to the third and fourth signals and the first and second reference signals, and generating the control signal in response to the first signal and the error signal and the other signal etc.

According to a second aspect of the invention, a zero-voltage-switching converter is provided for feeding a load circuit, the zero-voltage-switching converter comprising a chopper, a driver and a resonant tank and comprising the feedback circuit as defined above.

According to an embodiment, the zero-voltage-switching converter is defined by a combination of the zero-voltage-switching converter and the feedback circuit forming a self-oscillating converter.

According to an embodiment, the zero-voltage-switching converter is defined by the chopper comprising a full bridge or a half bridge or a full bridge operated in a half bridge mode.

According to a third aspect of the invention, a device is provided comprising the zero-voltage-switching converter as defined above and further comprising the load circuit. The load circuit may comprise a circuit with one or more light emitting diodes, without other kinds of load circuits being excluded.

The invention is based on an insight that zero-voltage-switching converters are relatively sensitive to feeding voltage fluctuations and load variations. The invention is based on a basic idea that in a feedback circuit, a first signal derived from a resonant tank signal, and a second signal derived from a load circuit signal, are to be used simultaneously for controlling a driver for driving a chopper in a zero-voltage-switching converter.

The invention has solved the problem mentioned above to provide a feedback circuit for a zero-voltage-switching converter, which zero-voltage-switching converter can stand feeding voltage fluctuations and load variations relatively well. The invention is further advantageous in that the feedback circuit can be relatively simple.

These and other aspects of the invention are apparent from and will be elucidated with reference to the embodiment(s) described hereinafter.

BRIEF DESCRIPTION OF THE DRAWINGS

In the drawings:
FIG. 5 shows embodiments of choppers connected to drivers,
FIG. 6 shows simulated steady state wave forms.

DETAILED DESCRIPTION OF EMBODIMENTS

Figure 1:
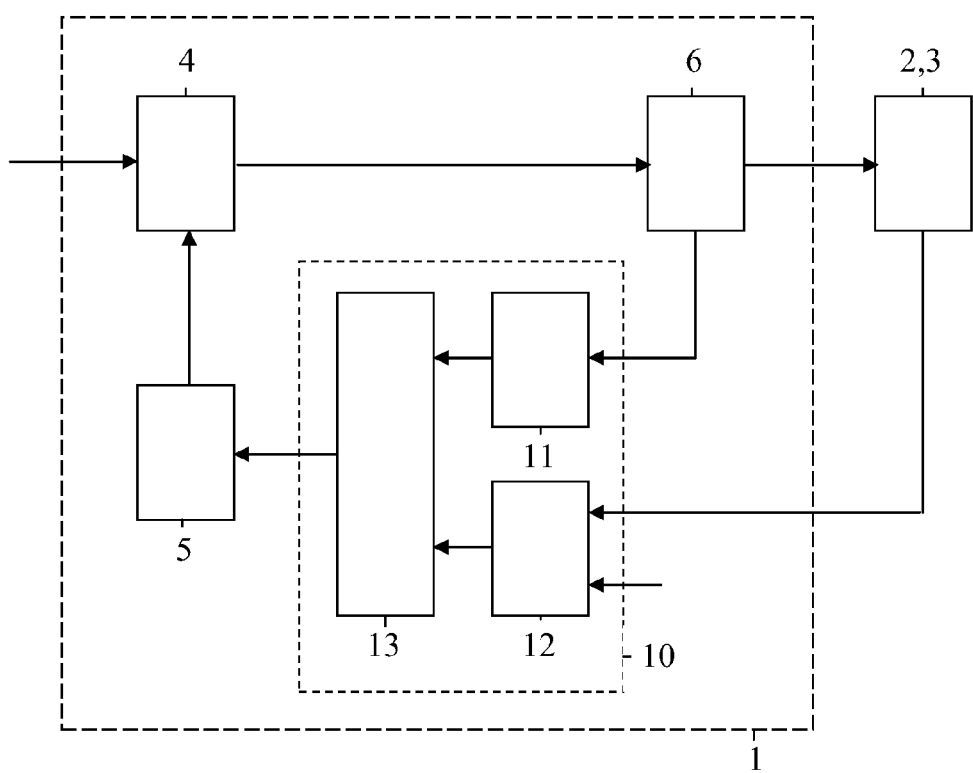
FIG. 1 shows a zero-voltage-switching converter connected to a load circuit.

In FIG. 1, a zero-voltage-switching converter 1 is shown connected to one load circuit 2, 3. The zero-voltage-switching converter 1 feeds the load circuit 2, 3 and comprises a chopper 4, a driver 5 connected to the chopper 4 for driving the chopper 4, and a resonant tank 6 connected to the chopper 4. An oscillatorless feedback circuit comprises an arrangement 10 for example coupled to the resonant tank 6 for receiving a first signal derived from a resonant tank signal and coupled to the load circuit 2, 3 for receiving a second signal derived from a load circuit signal. The arrangement 10 generates, in response to the first and second signals, a control signal for the driver 5.

Between the chopper 4 and the resonant tank 6, and/or between the resonant tank 6 and the load circuit 2, 3, further blocks, not shown, may be present, such as a transformer circuit, a rectifier circuit, a filter circuit, a measurement circuit etc.

The chopper 4 for example comprises a full bridge or a half bridge or a full bridge operated in a half bridge mode.

A combination of the zero-voltage-switching converter 1 and the feedback circuit for example forms a self-oscillating converter.

The arrangement 10 may comprise a circuit 11 for integrating and/or high pass filtering the first signal derived from the resonant tank signal and may comprise an error circuit 12 for generating an error signal, in response to the second signal derived from the load circuit signal and in response to a reference signal. The arrangement 10 may further comprise a combiner circuit 13 for generating the control signal for controlling the driver 5, in response to the (possibly integrated and/or possibly high pass filtered) first signal and the error signal.

Figure 2:
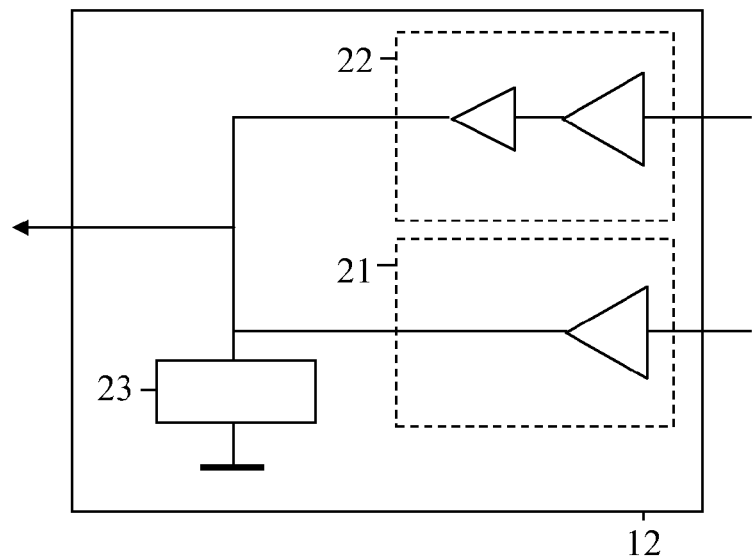
FIG. 2 shows an error circuit.

In FIG. 2, the error circuit 12 is shown. The error circuit 12 comprises a first converter circuit 21 for receiving the reference signal, a second converter circuit 22 for receiving the second signal, outputs of the first and second converter circuits 21, 22 being coupled to each other for providing the error signal, and an integrator circuit 23 for integrating the error signal. The first converter circuit 21 for example comprises a voltage controlled current generator, and the second converter circuit 22 for example comprises a voltage controlled current generator followed by a factor multiplier. The integrator circuit 23 for example comprises a serial connection of a capacitor and a resistor to ground.

Figure 3:
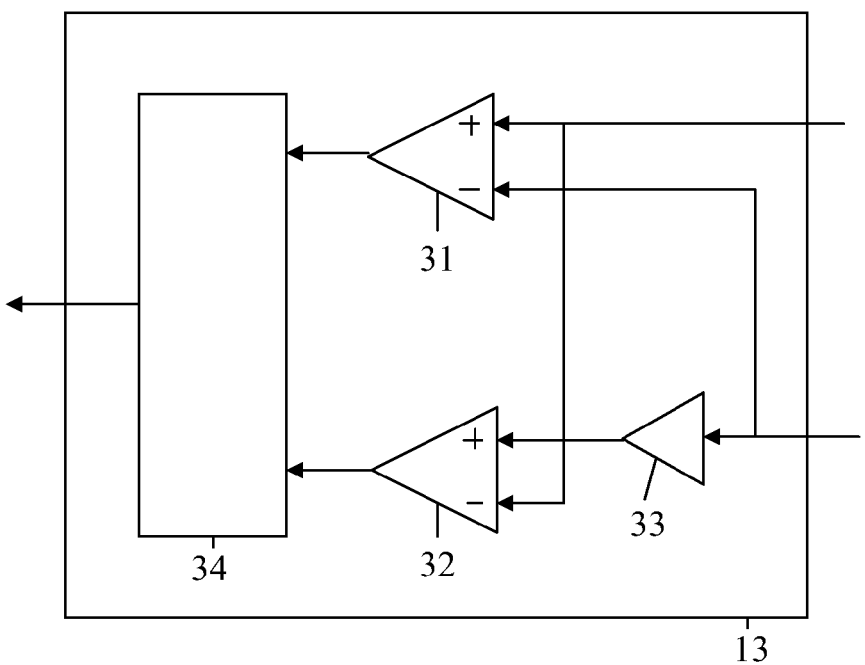
FIG. 3 shows a combiner circuit.
Figure 4A:
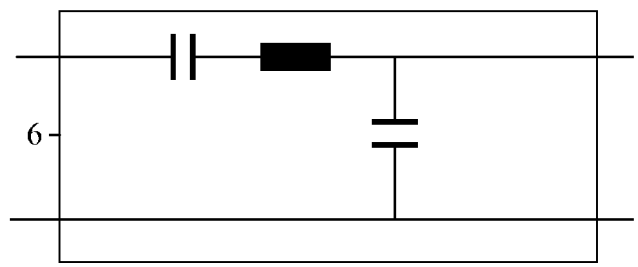
FIG. 4 shows embodiments of resonant tanks.
Figure 4B:
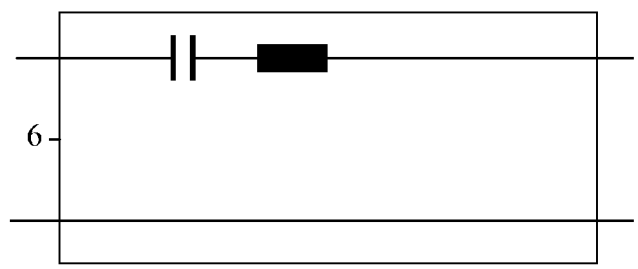
Figure 4C:
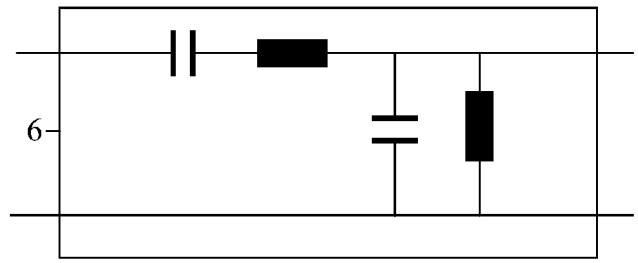
Figure 4D:
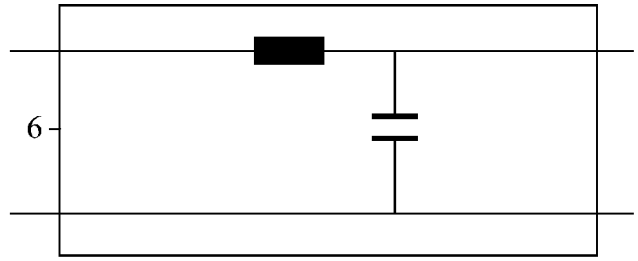
Figure 4E:
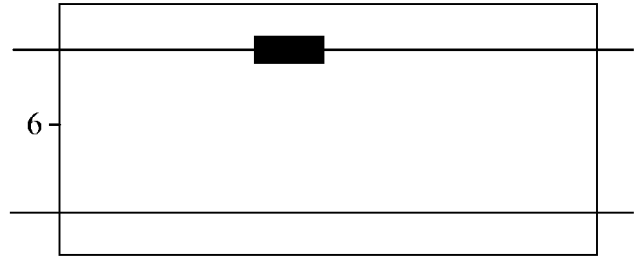

In FIG. 3, the combiner circuit 13 is shown. The combiner circuit 13 comprises a first differential circuit 31 for receiving the first signal at a positive input terminal and the error signal at a negative input terminal, a second differential circuit 32 for receiving the first signal at a negative input terminal and an inversion of the error signal at a positive input terminal, and a set and reset circuit 34 for receiving output signals from the first and second differential circuits 31 and 32 and for providing the control signal. To invert the error signal, an inverter 33 is used. The differential circuit 31, 32 for example comprises an operational amplifier, and the set and reset circuit 34 for example comprises a flip flop.

In FIG. 4, embodiments of resonant tanks 6 are shown. In FIG. 4A, an LCC embodiment is shown. In FIG. 4B, a series resonant embodiment is shown. In FIG. 4C, an LLCC embodiment is shown. In FIG. 4D, a parallel resonant embodiment is shown (that would require the circuit 11 comprising an integrator to be used). In FIG. 4E, a push-pull (non-resonant) embodiment is shown (that would require the circuit 11 comprising an integrator to be used).

In view of FIG. 4, the resonant tank signal could be a voltage across or a current flowing through one or more elements of the resonant tank 6. Similarly, the load circuit signal could be a voltage across or a current flowing through one or more elements of the load circuit 2, 3.

In FIG. 5, embodiments of choppers 4 connected to drivers 5 are shown. In FIG. 5A, a chopper 4 in the form of a half bridge with a single bus capacitor is shown (to be used in combination with the resonant tank embodiments of FIGS. 4A-4C). Across the single bus capacitor, a bus voltage is present. Between the output terminals, an output voltage is present, and through the upper output terminal, an output current is flowing. In FIG. 5B, a chopper 4 in the form of a half bridge with a split bus capacitor is shown (to be used in combination with the resonant tank embodiments of FIGS. 4D-4E). Across the split bus capacitor, a bus voltage is present. Between the output terminals, an output voltage is present, and through the upper output terminal, an output current is flowing.

The zero-voltage-switching converter 1 can stand feeding voltage fluctuations in the bus voltage and load variations relatively well.

In FIG. 6, simulated steady state wave forms are shown. With respect to the resonant tank embodiment shown in the FIG. 4A (LCC embodiment), in FIG. 6 the wave form A corresponds with the first signal when being derived (possibly via the high pass filter in the circuit 11) from the resonant tank signal in the form of a voltage present across the serial capacitor in FIG. 4A. The upper and lower dashed lines are the positive and negative versions of the error signal generated by the error circuit 12 shown in the FIG. 2.

Wave form B corresponds with the control signal generated by the combiner circuit 13. Wave form C corresponds with a voltage present at the control electrode of the lower transistor shown in the FIG. 5A (Td is a delay when reacting to the control signal shown as wave form B). Wave form D corresponds with a voltage present at the control electrode of the upper transistor shown in the FIG. 5A (Td is a delay when reacting to the control signal shown as wave form B). Wave form E corresponds with the output voltage present between the output terminals shown in the FIG. 5A, which output voltage is supplied to the resonant tank 6. Wave form F corresponds with an output current flowing through the upper output terminal shown in FIG. 5A (normal line) and with an output current flowing through the load circuit 2, 3 (dashed line).

Figure 7:
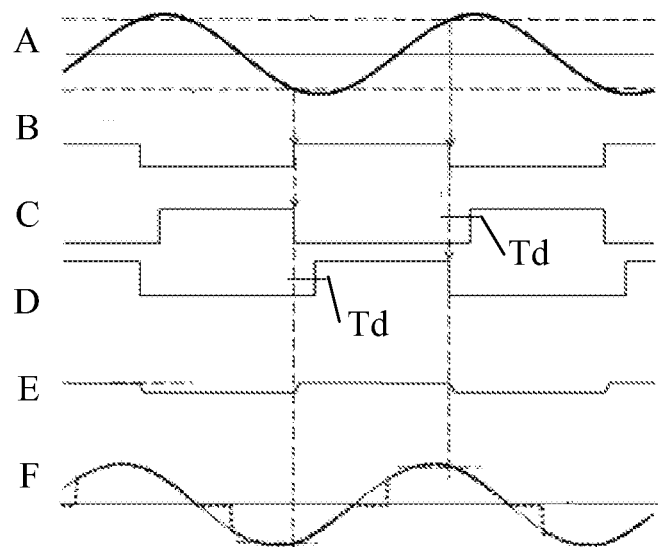
FIG. 7 shows simulated steady state wave forms.
Figure 8:
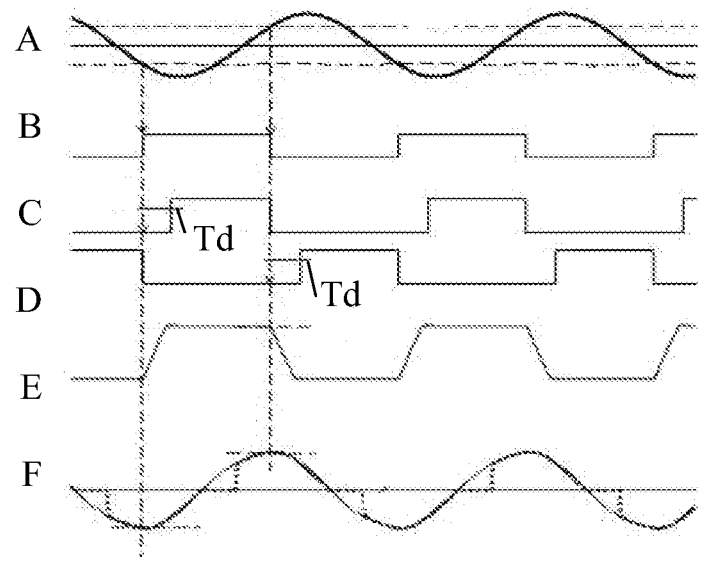
FIG. 8 shows simulated steady state wave forms.

In FIGS. 7 and 8, simulated steady state wave forms are shown in line with the ones shown in the FIG. 6, but here they relate to various values of the bus voltage as disturbances (see the dashed lines near the wave forms E). The reference signal has not changed. Clearly, large disturbances (compare the wave forms E in FIGS. 7 and 8) can be handled.

Figure 9:
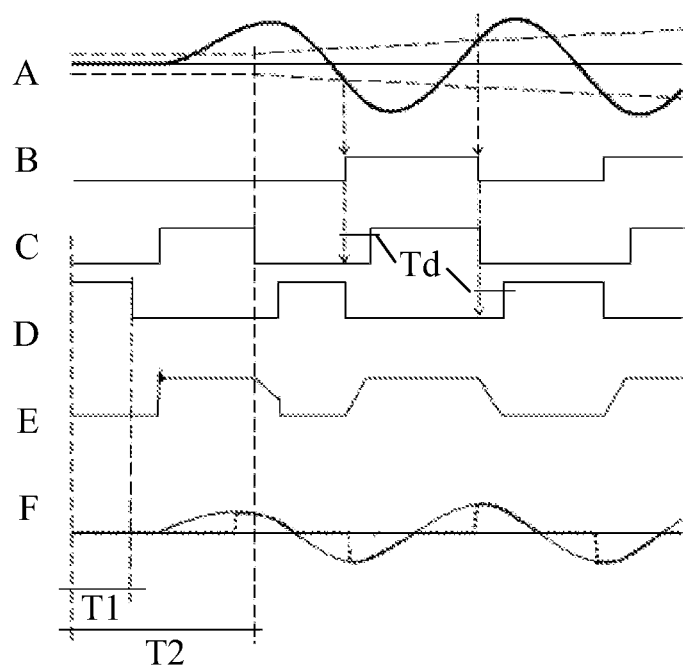
FIG. 9 shows simulated start-up transient wave forms.
Figure 10:
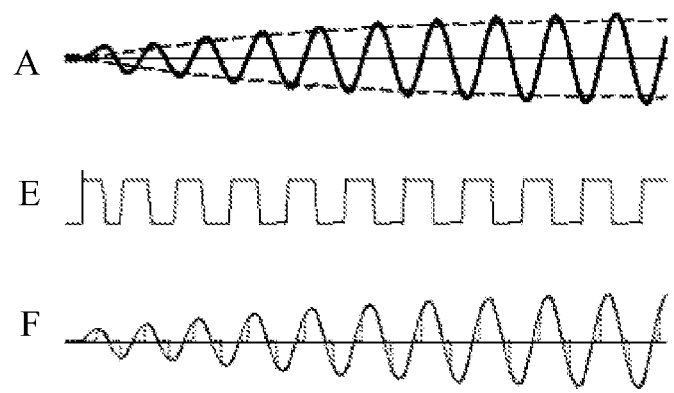
FIG. 10 shows transitions from start-up to steady state.

In FIGS. 9 and 10, simulated start-up transient wave forms (FIG. 9) and transitions from start-up to steady state (FIG. 10) are shown in line with the ones shown in FIG. 6. During preset times T1 and T2, the chopper 4 has to be turned on and off. After that, the converter 1 will self oscillate.

Figure 11:
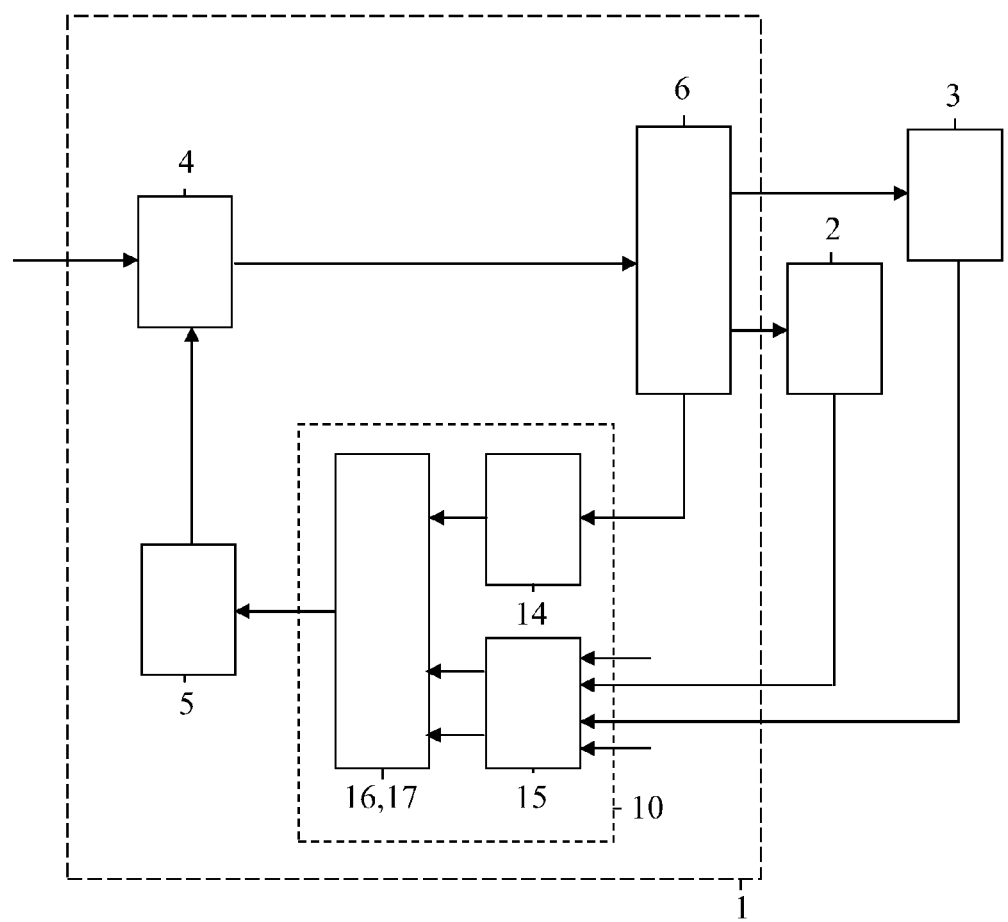
FIG. 11 shows a zero-voltage-switching converter connected to load circuits.

In FIG. 11, a zero-voltage-switching converter 1 is shown connected to (different) first and second load circuits 2 and 3. The zero-voltage-switching converter 1 feeds the load circuits 2 and 3 and comprises a chopper 4, a driver 5 connected to the chopper 4 for driving the chopper 4, and a resonant tank 6 connected to the chopper 4. A feedback circuit comprises an arrangement 10 for example coupled to the resonant tank 6 for receiving a first signal derived from a resonant tank signal and coupled to the load circuits 2 and 3 for receiving a second signal derived from a load circuit signal. The arrangement 10 generates, in response to the first and second signals, a control signal for the driver 5.

Between the chopper 4 and the resonant tank 6, and/or between the resonant tank 6 and the load circuits 2 and 3, further blocks, not shown, may be present, such as a transformer circuit, a rectifier circuit, a filter circuit, a measurement circuit etc.

The chopper 4 for example comprises a full bridge or a half bridge or a full bridge operated in a half bridge mode.

A combination of the zero-voltage-switching converter 1 and the feedback circuit for example forms a self-oscillating converter.

In view of the two load circuits 2 and 3, the load circuit signal comprises a first load circuit signal originating from the first load circuit 2 and a second load circuit signal originating from the second load circuit 3. As a result, the second signal comprises a third signal derived from the first load circuit signal and a fourth signal derived from the second load circuit signal.

The arrangement 10 may comprise a circuit 14 for integrating and/or high pass filtering the first signal derived from the resonant tank signal and may comprise an error circuit 15 for generating an error signal and another signal, in response to the third and fourth signals and first and second reference signals. The arrangement 10 may further comprise a combiner circuit 16, 17 for generating the control signal for controlling the driver 5, in response to the (possibly integrated and/or possibly high pass filtered) first signal and the error signal and the other signal.

In the error circuit 15, for example two (actuating/threshold) signals are processed. According to a simple embodiment, this may be done in the same manner as described with respect to FIG. 2, for example by means of two error units resulting in two error signals and two control units resulting in the two (actuating/threshold) signals for the combiner circuit 16, 17. Other embodiments are not to be excluded.

Figure 12:
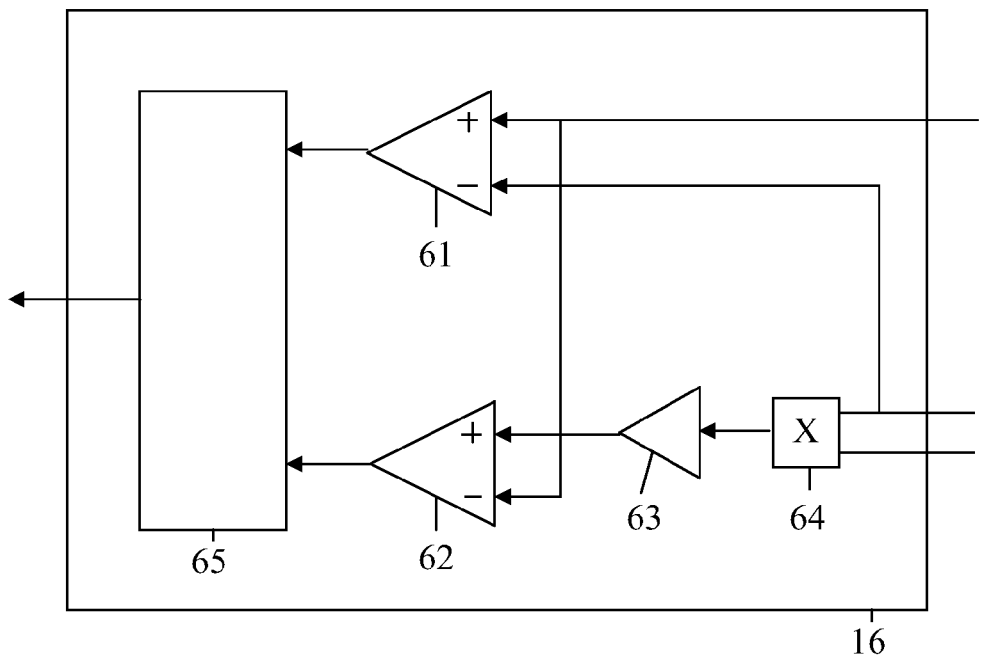
FIG. 12 shows a first embodiment of a combiner circuit.

In FIG. 12, a first embodiment of a combiner circuit 16 is shown. The combiner circuit 16 comprises a first differential circuit 61 for receiving the first signal at a positive input terminal and the error signal at a negative input terminal, a second differential circuit 62 for receiving the first signal at a negative input terminal and an inversion of a product of the error signal and the other signal at a positive input terminal, which other signal is a duty cycle signal, and a set and reset circuit 65 for receiving output signals from the first and second differential circuits 61 and 62 and for providing the control signal. To multiply the error signal and the other signal, a multiplier 64 is used, and to invert a product of the error signal and the other signal, an inverter 63 is used. The differential circuit 61, 62 for example comprises an operational amplifier, and the set and reset circuit 65 for example comprises a flip flop.

Figure 13:
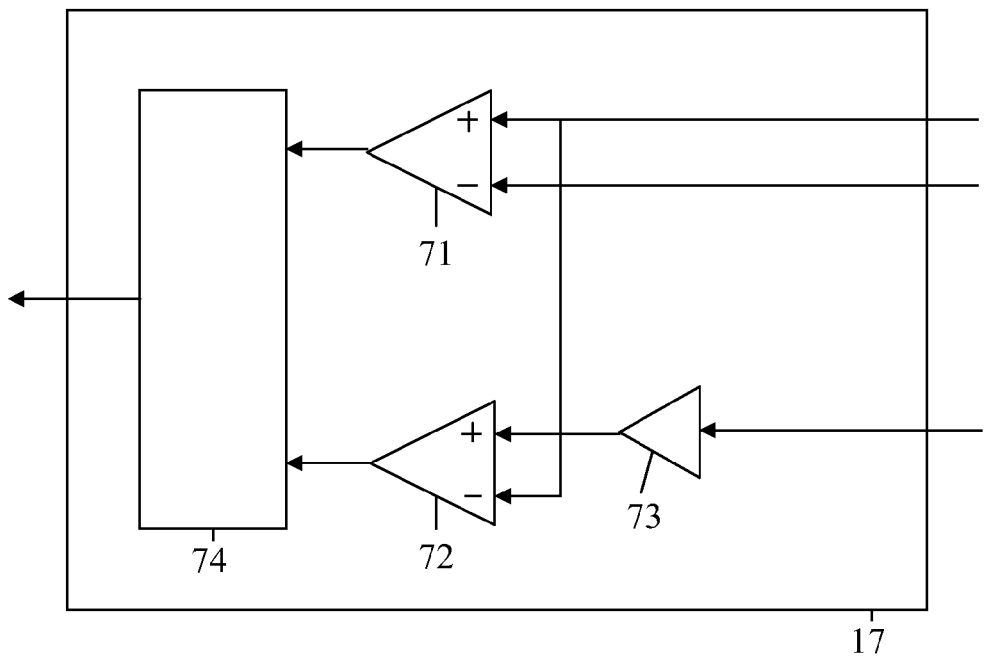
FIG. 13 shows a second embodiment of a combiner circuit.

In FIG. 13, a second embodiment of a combiner circuit 17 is shown. The combiner circuit 17 comprises a first differential circuit 71 for receiving the first signal at a positive input terminal and the error signal at a negative input terminal, a second differential circuit 72 for receiving the first signal at a negative input terminal and an inversion of the other signal at a positive input terminal, which other signal is a further error signal, and a set and reset circuit 74 for receiving output signals from the first and second differential circuits 71 and 72 and for providing the control signal. To invert the other signal, an inverter 73 is used. The differential circuit 71, 72 for example comprises an operational amplifier, and the set and reset circuit 74 for example comprises a flip flop.

Figure 14:
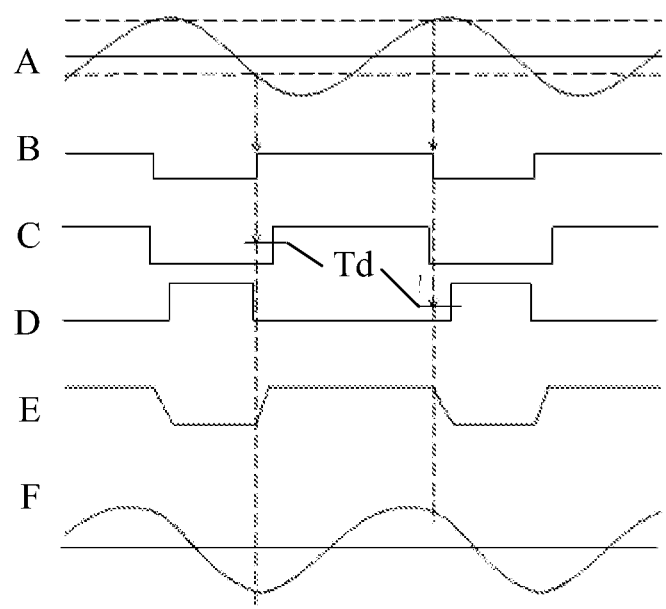
FIG. 14 shows simulated steady state wave forms.

In FIG. 14, simulated steady state wave forms are shown in line with the ones shown in the FIG. 6, but here they relate to the converter 1 shown in FIG. 11 and the combiner circuit 16 shown in FIG. 12. The upper and lower dashed lines near the wave form A are the positive version of the error signal and the negative version of a product of the error signal and the duty cycle signal. This asymmetric error band, created by the error signal and the duty cycle signal, results in an asymmetric duty cycle operation.

Figure 15:
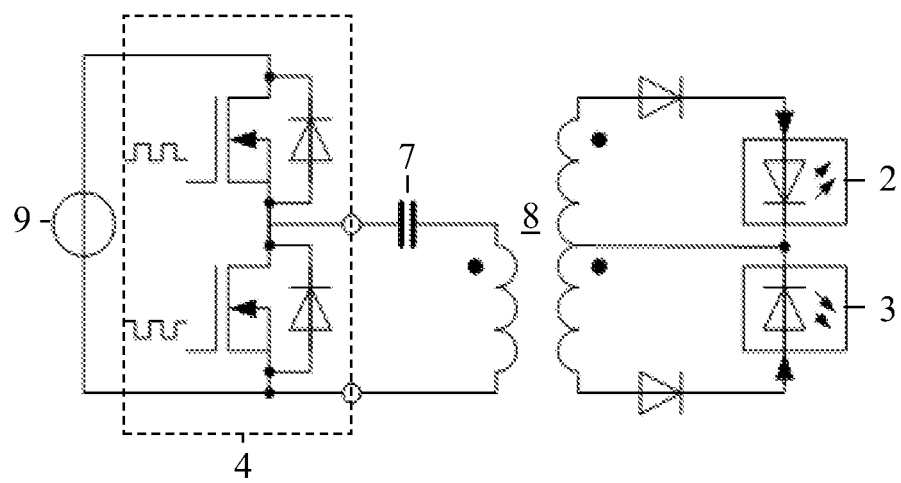
FIG. 15 shows a chopper connected to load circuits via a transformer.

In FIG. 15, a chopper 4 is shown connected to load circuits 2 and 3 via a transformer 8. The chopper 4 in the form of a half bridge receives a feeding voltage (a bus voltage) from a source 9. Between the output terminals, an output voltage is present, and through the upper output terminal, an output current is flowing, via a capacitor 7, to a primary winding of the transformer 8. Two secondary windings of the transformer 8 are coupled to the first and second load circuits 2 and 3, for example via diodes, or one secondary winding of the transformer 8 is divided into two parts coupled to the first and second load circuits 2 and 3, for example via diodes. Two load circuits 2 and 3 can be individually controlled via a single converter 1 in a LLC embodiment.

Here, the capacitor 7 and the transformer 8 form a resonant tank. This resonant tank has two outputs for two load circuits 2 and 3 as shown in FIG. 11. Alternatively, a resonant tank made of one or more capacitors and/or one or more coils may be created, as shown in FIG. 4. Such a resonant tank only has one output (not shown in FIG. 11). In that case, the resonant tank may for example be followed by a transformer (not shown in FIG. 11) etc.

Figure 16:
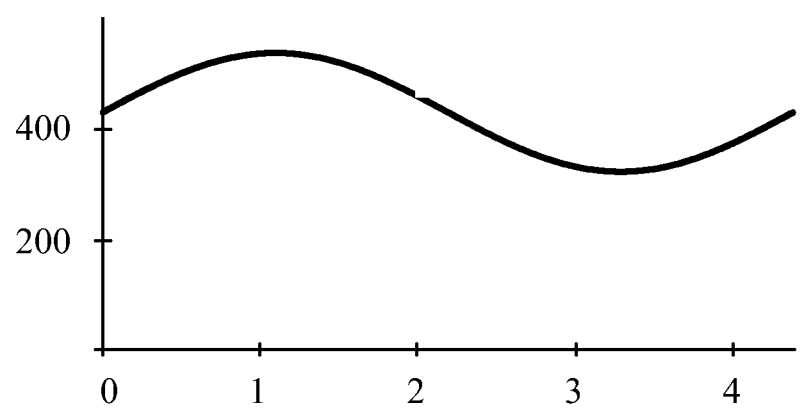
FIG. 16 shows simulated transient responses.
Figure 16:
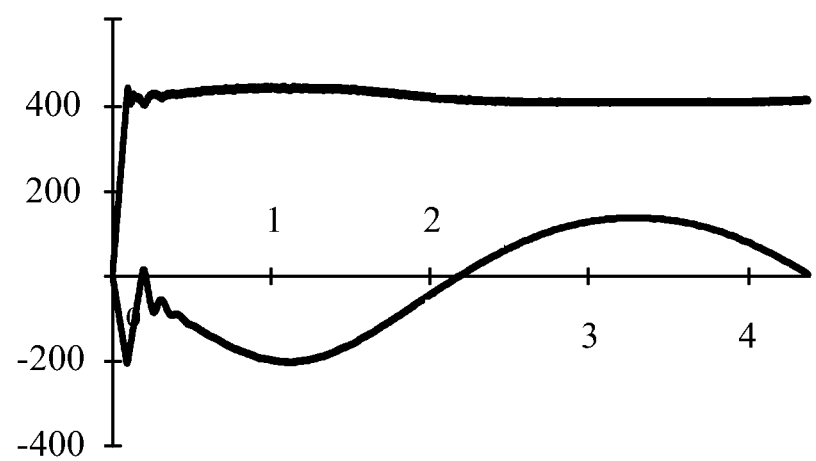
Figure 16:
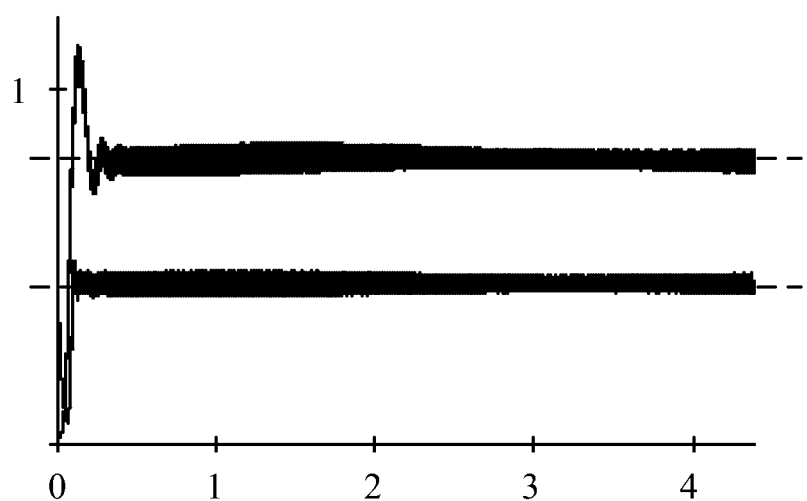

In FIG. 16, simulated transient responses are shown. The upper graph shows the bus voltage (feeding voltage fluctuations±25%), voltage in Volt versus time in msec. The middle graph shows control values in terms of switching voltages to be compared with the capacitor voltage, voltage in Volt versus time in msec. The lower graph shows the currents through the load circuits 2 and 3 in the form of two controlled light emitting diode strings, normalized in view of the first and second reference signals as indicated by the horizontal dashed lines versus time in msec.

Figure 17:
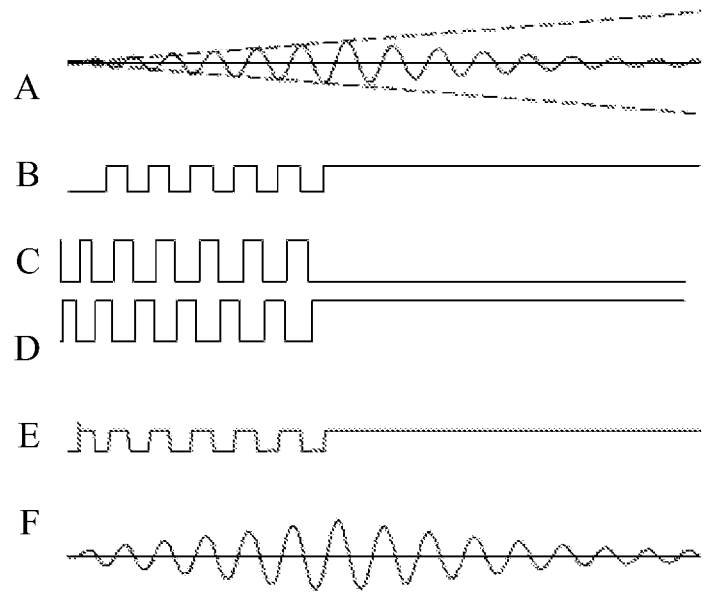
FIG. 17 shows simulated start-up transient wave forms for a faulty feedback.

In FIG. 17, simulated start-up transient wave forms are shown for a faulty feedback, in line with the ones shown in FIG. 6, but here they relate to a converter that turns itself off in case of a start-up trial and a faulty feedback signal. In case of too low a bus voltage or in case of no (or no more) feedback, the arrangement 10 will cause a self lock off of the converter 1 after a few cycles as shown in FIG. 17. Excess-current protection can be obtained by monitoring the amplitude of the first signal representing a total current flown into the converter 1 during one half of a cycle.

Figure 18:
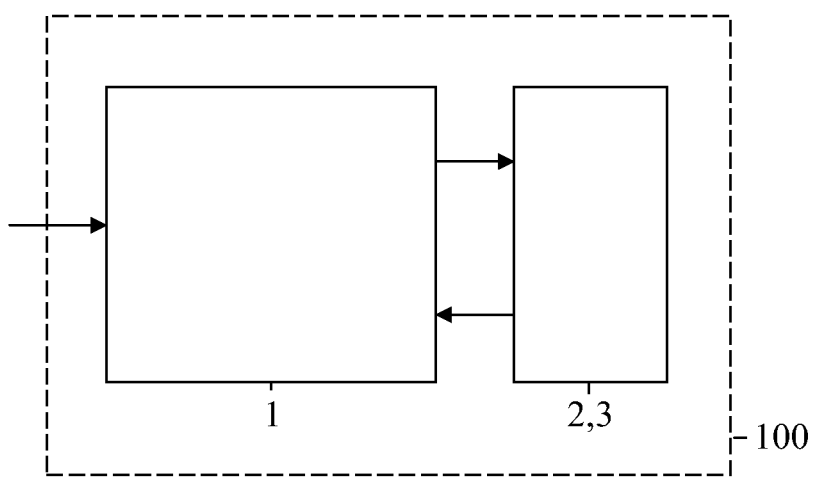
FIG. 18 shows a device.

In FIG. 18, a device 100 is shown comprising the zero-voltage-switching converter 1 and also comprising the load circuit 2, 3.

Thus, a simple and robust means has been created to actuate a chopper of a typical load resonant converter. It processes the switching signal directly without an external oscillator being required. Interesting but non-limiting possibilities are feedback control of output current or voltage, applicability to a variety of converter topologies, intrinsic zero voltage switching without extra measures being required, full exploitation of maximum conversion power, large input voltage variations being allowed, fast and stable controller response, pulse width modulation dimming at high dimming frequencies being allowed, simple start up sequence without inrush current protection being required, no fault condition handling required, since in case of under-voltage or absence of the feedback, the control simply stops switching, the approach can be applied to dual output type converters controlled by both frequency and duty cycle, and the ability to cope with a second controlled value can be used to integrate a pre-conditioner, i.e. a power factor correction stage.

Summarizing, a feedback circuit for a zero-voltage-switching converter 1 for feeding a load circuit 2, 3, which converter 1 comprises a chopper 4, a driver 5 and a resonant tank 6, is provided with an arrangement 10 for receiving a first signal derived from a resonant tank signal and a second signal derived from a load circuit signal and for generating, in response thereto, a control signal for the driver 5. Such converters 1 can stand feeding voltage fluctuations and load variations relatively well. The arrangement 10 may comprise an error circuit 12 for generating an error signal, in response to the second signal and a reference signal, and a combiner circuit 13 for generating the control signal, in response to the first signal and the error signal. The same converter 1 may be used for supplying two or more load circuits 2, 3, in which case an error circuit 15 may generate an error signal and a duty cycle signal or two error signals.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A feedback circuit for a zero-voltage-switching converter (1) for feeding a load circuit (2, 3), the zero-voltage-switching converter (1) comprising a chopper (4), a driver (5) and a resonant tank (6), the feedback circuit comprising an arrangement (10) for receiving a first signal derived from a resonant tank signal and for receiving a second signal derived from a load circuit signal and for generating, in response to the first and second signals, a control signal for the driver (5), the feedback circuit being oscillatorless.

2. The feedback circuit as defined in claim 1, the arrangement (10) comprising
   an error circuit (12) for generating an error signal, in response to the second signal and a reference signal, and
   a combiner circuit (13) for generating the control signal, in response to the first signal and the error signal.

3. The feedback circuit as defined in claim 2, the error circuit (12) comprising
   a first converter circuit (21) for receiving the reference signal,
   a second converter circuit (22) for receiving the second signal, outputs of the first and second converter circuits (21, 22) being coupled to each other for providing the error signal, and
   an integrator circuit (23) for integrating the error signal.

4. The feedback circuit as defined in claim 2, the combiner circuit (13) comprising
   a first differential circuit (31) for receiving the first signal and the error signal,
   a second differential circuit (32) for receiving the first signal and an inversion of the error signal, and
   a set and reset circuit (34) for receiving output signals from the first and second differential circuits (31, 32) and for providing the control signal.

5. The feedback circuit as defined in claim 1, the load circuit (2, 3) comprising a first load circuit (2) and a second load circuit (3), the load circuit signal comprising a first load circuit signal and a second load circuit signal, the second signal comprising a third signal derived from the first load circuit signal and a fourth signal derived from the second load circuit signal.

6. The feedback circuit as defined in claim 5, the arrangement (10) comprising
   an error circuit (15) for generating an error signal and another signal, in response to the third and fourth signals and first and second reference signals, and
   a combiner circuit (16, 17) for generating the control signal, in response to the first signal and the error signal and the other signal.

7. The feedback circuit as defined in claim 6, the combiner circuit (16) comprising
   a first differential circuit (61) for receiving the first signal and the error signal,
   a second differential circuit (62) for receiving the first signal and an inversion of a product of the error signal and the other signal, which other signal is a duty cycle signal, and
   a set and reset circuit (65) for receiving output signals from the first and second differential circuits (61, 62) and for providing the control signal.

8. The feedback circuit as defined in claim 6, the combiner circuit (17) comprising
   a first differential circuit (71) for receiving the first signal and the error signal,
   a second differential circuit (72) for receiving the first signal and an inversion of the other signal, which other signal is a further error signal, and
   a set and reset circuit (74) for receiving output signals from the first and second differential circuits (71, 72) and for providing the control signal.

9. The feedback circuit as defined in claim 1, the first signal being derived from the resonant tank signal via an integrator and/or a filter circuit and/or a first connection, and the second signal being derived from the load circuit signal via a second connection.

10. The feedback circuit as defined in claim 1, the resonant tank signal being a voltage across or a current flowing through one or more elements of the resonant tank (6), and the load circuit signal being a voltage across or a current flowing through one or more elements of the load circuit (2, 3).

11. A zero-voltage-switching converter (1) for feeding a load circuit (2, 3), the zero-voltage-switching converter (1) comprising a chopper (4), a driver (5) and a resonant tank (6) and comprising the feedback circuit as defined in claim 1.

12. The zero-voltage-switching converter (1) as defined in claim 11, a combination of the zero-voltage-switching converter (1) and the feedback circuit forming a self-oscillating converter.

13. The zero-voltage-switching converter (1) as defined in claim 11, the chopper (4) comprising a full bridge or a half bridge or a full bridge operated in a half bridge mode.

14. A device (100) comprising the zero-voltage-switching converter (1) as defined in claim 11 and further comprising the load circuit (2, 3).

\* \* \* \* \*